United States Patent [19]
Ripley

[11] Patent Number: 6,105,117
[45] Date of Patent: Aug. 15, 2000

[54] SOURCE ORIENTED DATA BLOCK RELOCATION METHODOLOGY AND APPLICATIONS

[75] Inventor: Michael S. Ripley, Hillsboro, Oreg.

[73] Assignee: Intel Corporation, Santa Clara, Calif.

[21] Appl. No.: 08/885,327

[22] Filed: Jun. 30, 1997

[51] Int. Cl.[7] .................................................. G06F 12/00
[52] U.S. Cl. ........................... 711/165; 711/100; 711/202
[58] Field of Search .................................. 711/112, 165, 711/154, 169, 215, 217, 173, 100, 104, 111–2, 162, 170–1; 395/621, 674, 842, 843, 844; 710/129, 24, 200–5

[56] References Cited

U.S. PATENT DOCUMENTS

| | | | |
|---|---|---|---|
| 5,317,704 | 5/1994 | Izawa et al. ............................ | 711/207 |
| 5,398,253 | 3/1995 | Gordon .................................. | 371/40.4 |
| 5,457,791 | 10/1995 | Matsumoto et al. ............... | 395/182.03 |
| 5,530,808 | 6/1996 | Hammond et al. ..................... | 709/249 |
| 5,787,296 | 7/1998 | Grimsrud et al. ................. | 395/750.03 |
| 5,802,593 | 9/1998 | Grimsrud ................................ | 711/165 |
| 5,802,600 | 9/1998 | Smith et al. ............................ | 711/173 |
| 5,828,855 | 10/1998 | Walker .................................... | 710/129 |
| 5,832,515 | 11/1998 | Ledain et al. .......................... | 707/202 |
| 5,890,205 | 3/1999 | Grimsrud et al. ..................... | 711/165 |

*Primary Examiner*—John W. Cabeca
*Assistant Examiner*—Pierre-Michel Bataille
*Attorney, Agent, or Firm*—Blakely, Sokoloff, Taylor & Zafman LLP

[57] ABSTRACT

An apparatus is equipped with a source oriented data move technique. In one embodiment, the apparatus is a computer system and the source oriented data moving technique is incorporated in a disk block relocation engine that relocates disk blocks in accordance with the specifications of a disk block relocation vector. In one embodiment, the disk block relocation vector is destination oriented, and the disk block relocation engine is complemented with an transformation function for annotating the destination oriented disk block relocation vector with data source information. The disk block relocation engine then identifies chains of serial disk block moves among the specified disk block moves, and performs the chains of serial disk block moves, keying off the annotated data source information.

19 Claims, 13 Drawing Sheets

(PRIOR ART)

FIG. 2A

| BLOCK ID 108 | BLOCK CONTENT 110 |
|---|---|
| B1 | A |
| B2 | B |
| B3 | C |
| B4 | D |
| B5 | E |
| B6 | F |
| B7 | <EMPTY> |

| BLOCK ID 112 | SPECIFIED DESTINATION 114 | | ASSIGNED DESTINATION 116 |
|---|---|---|---|
| B1 | B2 | | |
| B2 | B3 | | |
| B3 | | | B1 |
| B4 | B5 | | |
| B5 | B6 | | |
| B6 | | | B4 |
| B7 | | | |

102

(PRIOR ART)

FIG. 2C

| MOVE ID | MOVE | MOVE ID | MOVE |
|---|---|---|---|
| 1 | B2 -> B7 | 7 | B5 -> B7 |
| 2 | B1 -> B2 | 8 | B4 -> B5 |
| 3 | B7 -> B1 | 9 | B7 -> B4 |
| 4 | B3 -> B7 | 10 | B6 -> B7 |
| 5 | B1 -> B3 | 11 | B4 -> B6 |
| 6 | B7 -> B1 | 12 | B7 -> B4 |

(PRIOR ART)

FIG. 2D

| BLOCK ID | BLOCK CONTENT |
|---|---|
| B1 | C |
| B2 | A |
| B3 | B |
| B4 | F |
| B5 | D |
| B6 | E |
| B7 | <EMPTY> |

FIG. 4A

| BLOCK ID 206 | SPECIFIED DEST 208 | ASSIGNED DEST 210 | SOURCE 212 |
|---|---|---|---|
| B1 | B2 | | B3 |
| B2 | B3 | | B1 |
| B3 | | B1 | B2 |
| B4 | B5 | | B6 |
| B5 | B6 | | B4 |
| B6 | | B4 | B5 |
| B7 | | | |

| MOVE ID | MOVE | MOVE ID | MOVE |
|---|---|---|---|
| 1 | B3 -> B7 | 5 | B6 -> B7 |
| 2 | B2 -> B3 | 6 | B5 -> B6 |
| 3 | B1 -> B2 | 7 | B4 -> B5 |
| 4 | B7 -> B1 | 8 | B7 -> B4 |

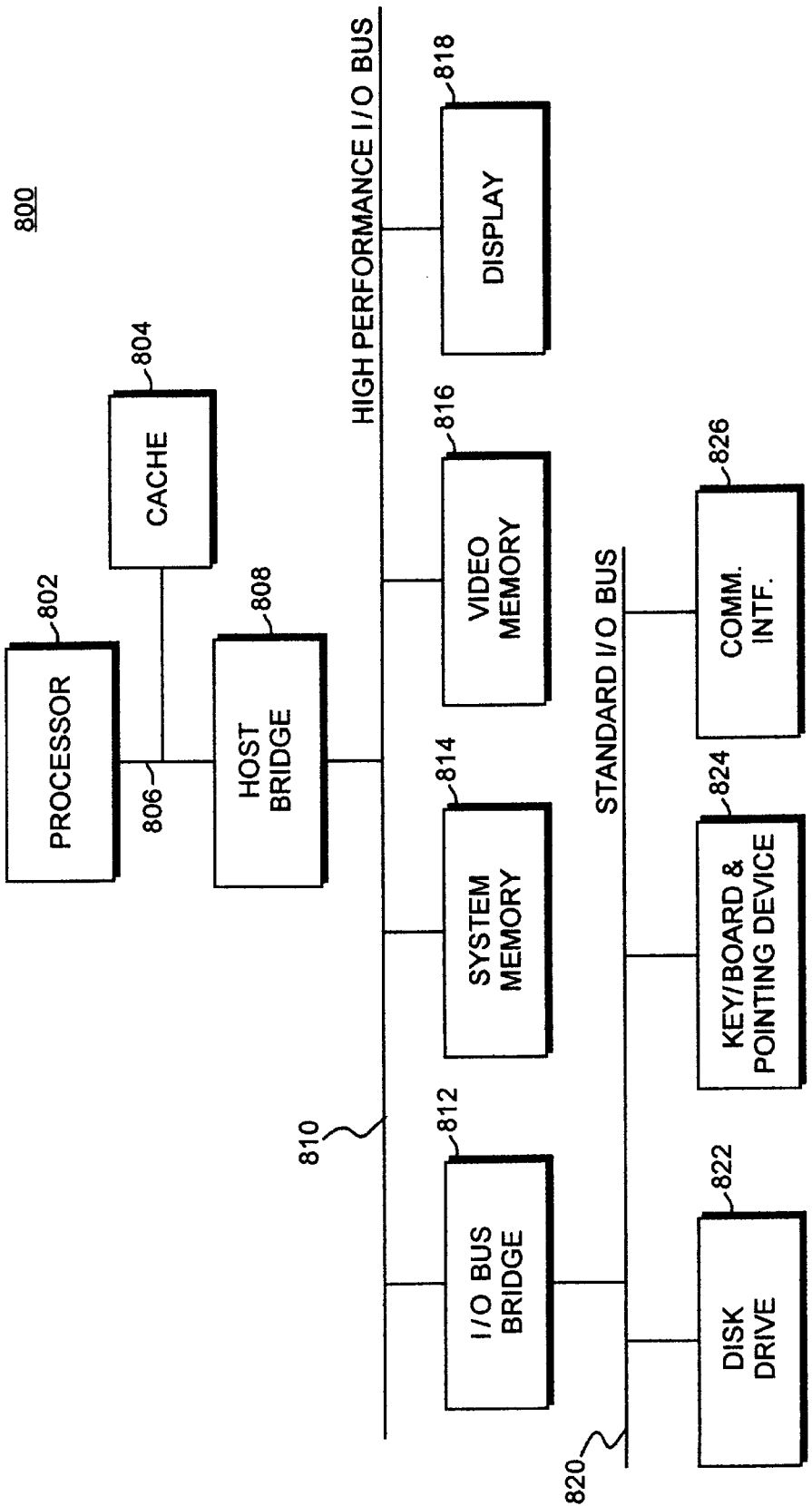

SOURCE ORIENTED DATA BLOCK RELOCATION METHODOLOGY AND APPLICATIONS

BACKGROUND OF THE INVENTION

1. Field of the Invention

The present invention relates to the field of computer systems. More specifically, the present invention relates to data block relocation methodology and apparatuses incorporated with such methodology.

2. Background Information

In the art of computer systems, many problems involve relocating data blocks. For examples, in U.S. patent application, Ser. No. 08/708,983, entitled Method and Apparatus For Improving Disk Drive Performance, filed on Sep. 6, 1996, assigned to the assignee of the present invention, certain disk block relocation methodology for improving disk drive performance was disclosed. In particular, a standalone disk block relocation utility incorporated with the disk block relocation methodology was disclosed. In U.S. patent application, Ser. No. 08/721,826, also entitled Method and Apparatus For Improving Disk Drive Performance, filed on Sep. 27, 1996, assigned to the assignee of the present invention, incorporation of the disk block relocation utility into an installation utility of an application for improving the application start up time through disk block relocation was disclosed. In U.S. patent applications, Ser. No. 08/822,640, entitled Reducing Operating System Start Up/Boot Time Through Disk Block Relocation, filed on Mar. 21, 1997, assigned to the assignee of the present invention, partial incorporation of the disk block relocation utility into an operating system for improving the start up/boot time of the operating system was disclosed.

In each case, whether it was the standalone utility, the application installation utility or the complementary function to the operating system, a disk block relocation engine is provided. The disk block relocation engine relocates disk blocks in accordance with a disk block relocation vector, using any one of a number of data moving techniques known in the art, as illustrated by FIG. 1. The data moving technique employed by relocation engine 100 is typically "destination oriented", that is, the data move operations are performed based on the identity of the destination blocks. Thus, relocation vector 102 is also typically "destination oriented".

FIGS. 2A–2D illustrate one such data moving technique, a "destination and swap oriented" technique. Specifically, FIG. 2A illustrates an exemplary collection of disk blocks, disk block B1 through B7, with disk blocks B1–B6 having content A through F, and disk block B7 having no content, i.e. initially empty or unused. FIG. 2B illustrates an exemplary destination oriented disk block relocation vector 102 for exemplary disk blocks B1 through B7. Exemplary disk block relocation vector 102 specifies that the contents of disk blocks B1, B2, B4 and B5 are to be relocated to disk blocks B2, B3, B5 and B6 respectively. In other words, disk block B2 is the destination disk block for the current content of disk block B1, disk block B3 is the destination disk block for the current content of disk block B2, and so forth.

For illustrative purpose, disk blocks B3 and B6 are not among the disk blocks of interest, thus exemplary disk block relocation vector 102 does not specify where the displaced contents of disk blocks B3 and B6 should be moved. Typically, disk block relocation engine 100 would arbitrarily allocate some of the available disk blocks as the destination disk blocks. For illustrative purpose, we will assume the arbitrarily assigned destination disk blocks to be disk blocks B1 and B4. Disk blocks B1 and B4 are available because their contents are going to be moved to disk blocks B3 and B5 respectively.

As illustrated by FIG. 2C, typically, disk block relocation engine 100 would process disk block relocation vector 102 sequentially, one disk block entry at a time. The first disk block entry calls for the content of disk block B1 to be moved to disk block B2. Since B2 is used, the content of B2 is first moved to a staging disk block, e.g. disk block B7, then the content of disk block B1 is moved to the now available disk block B2. After that, the content from the staging area is moved back to the now available disk block B1. In other words, the first three moves are "B2→B7", "B1→B2", then "B7→B1" as shown in FIG. 2c.

The next disk block entry calls for the initial content of disk block B2, which is now in disk block B1, to be moved to disk block B3. So a similar triple moves occur, i.e. "B3→B7", "B1→B3", then "B7→B1" as shown in FIG. 2c. The next disk block entry calls for the initial content of disk block B3, which is now in disk block B1, to be moved to disk block B1. Since the move has already been accomplished, disk block relocation engine 100 moves on to process the next disk block relocation entry, which calls for the initial content of disk block B4, which is still in disk block B4, to be moved to disk block B5. Again a similar triple moves occur, i.e. "B5→B7","B4→B5", then "B7→B4" as shown in FIG. 2c.

The next disk block entry calls for the initial content of disk block B5, which is now in disk block B4, to be moved to disk block B6. So again a similar triple moves occur, i.e. "B6→B7", "B4→B6", then "B7→B4" as shown in FIG. 2c. Finally, the last disk block entry calls for the "pre-move" content of disk block B6, which is now in disk block B4, to be moved to disk block B4. Since the move has already been accomplished and all disk block relocation entries have been processed, disk block relocation engine 100 terminates the relocation process. The desired moves have all been accomplished, resulting in disk blocks B1–B6 storing contents C, A, B, F, D, E respectively, as illustrated in FIG. 2D.

Thus, for the exemplary disk block collection and the exemplary desired disk block relocations, disk block relocation engine 100, using one of the "destination and swap oriented" technique of the art, would require about 12 move operations. Those skilled in the art will recognize that in real life, disk block relocation problems are much more complex than that, requiring hundreds if not thousands of move. Therefore, it is desirable to be able to reduce the number of move operations required to accomplish a given set of data relocation objectives.

SUMMARY OF THE INVENTION

An apparatus is equipped with a source oriented data move technique. In one embodiment, the apparatus is a computer system and the source oriented data moving technique is incorporated in a disk block relocation engine that relocates disk blocks in accordance with the specification of a disk block relocation vector. In one embodiment, the disk block relocation vector is destination oriented, and the disk block relocation engine is complemented with a transformation function for annotating the destination oriented disk block relocation vector with data source information. The disk block relocation engine then identifies chains of serial disk block moves among the specified disk block moves, and performs the chains of serial disk block moves, keying off the annotated data source information.

BRIEF DESCRIPTION OF DRAWINGS

The present invention will be described by way of exemplary embodiments, but not limitations, illustrated in the accompanying drawings in which like references denote similar elements, and in which:

FIGS. 2A–2D illustrate an exemplary set of disk blocks, an exemplary destination oriented disk block oriented vector, and data move operations performed to accomplish the desired disk block relocation using a prior art destination and swap oriented data move technique;

FIGS. 4A–4B illustrate an exemplary disk block relocation vector annotated with data source information in accordance with the present invention, and data move operations performed to accomplish the desired disk block relocation using the source oriented data move technique of the present invention;

FIG. 8 illustrates one embodiment of a computer system suitable for programming with the source oriented disk block relocation engine of the present invention.

DETAILED DESCRIPTION OF THE INVENTION

In the following description, the present invention will be described in the context of a disk block relocation problem. Those skilled in the art will recognize that the present invention may be practiced in other data relocation problems. Additionally, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system includes general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1:
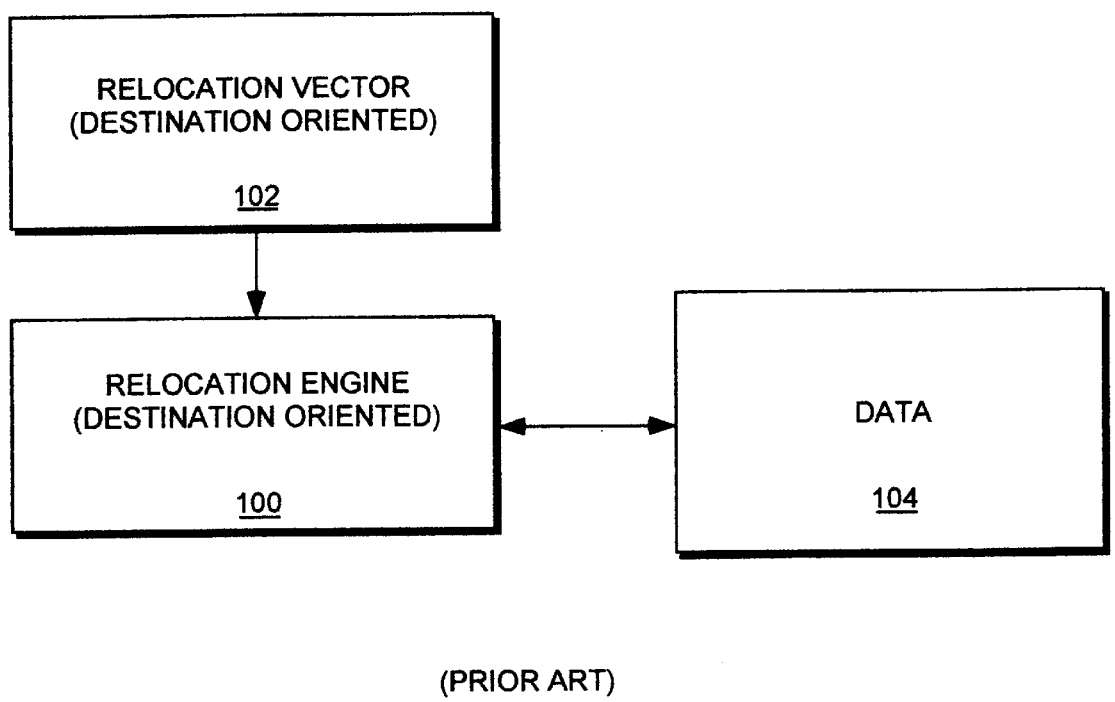
FIG. 1 is a block diagram illustrating an exemplary prior art destination oriented disk block relocation engine.
Figure 3:
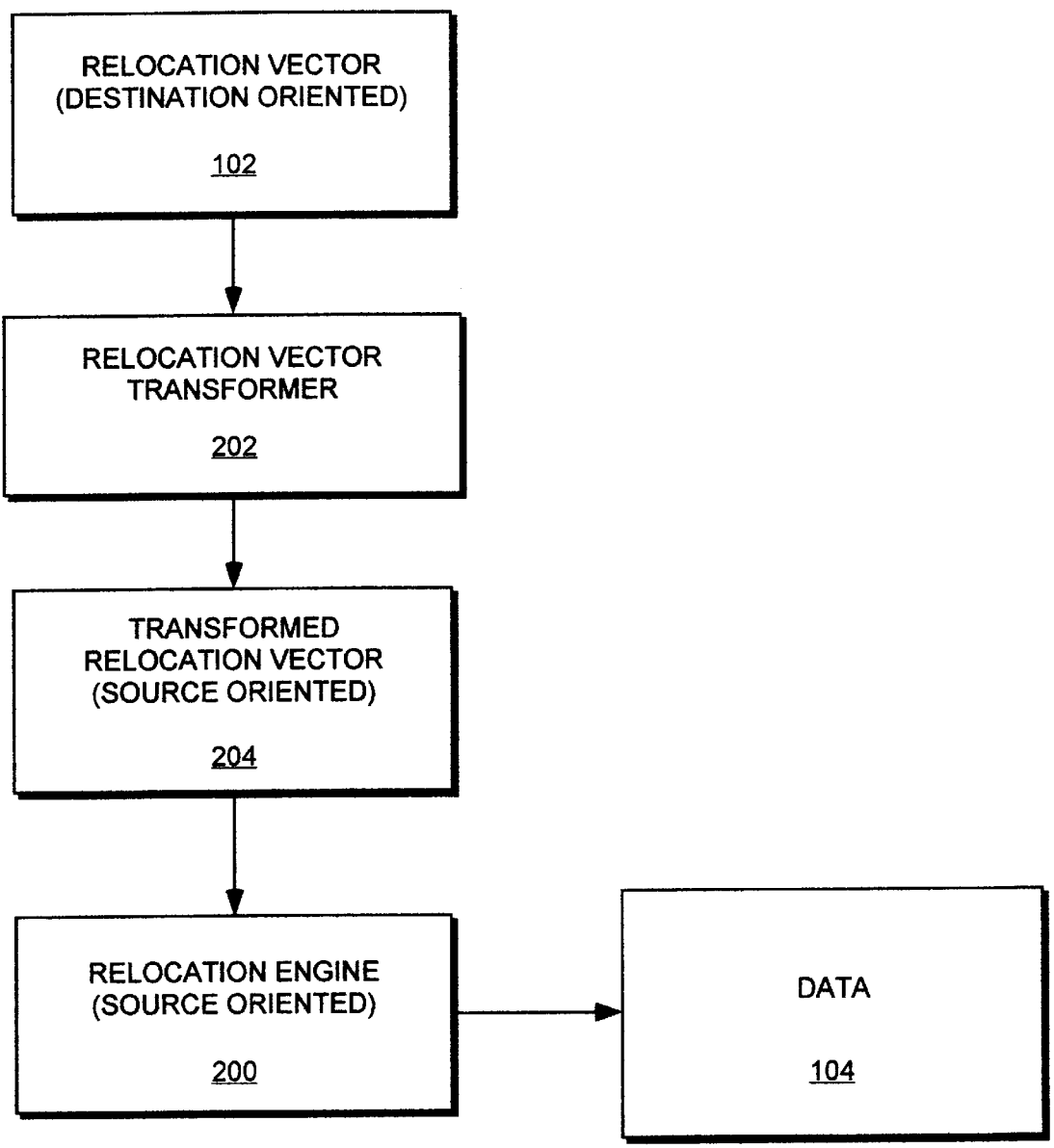
FIG. 3 illustrates one embodiment of the present invention.

Referring now to FIG. 3, wherein a block diagram illustrating a source oriented disk block relocation engine embodiment of the present invention is shown. As illustrated, source oriented disk block relocation engine 200 effectuates a desired set of disk block relocations against data collection 104 using source information in source oriented disk block relocation vector 204. For the illustrated embodiment, source oriented disk block relocation vector 204 is generated by relocation vector transformer 202 of the present invention, which annotates conventional destination oriented disk block relocation vector 102 with data source information.

For ease of understanding, before we describe relocation vector transformer 202 and source oriented disk block relocation engine 200 in further details, we will describe how the earlier described exemplary disk block relocation is achieved for the earlier described exemplary disk block collection, under the present invention. FIG. 4A illustrates an exemplary source oriented disk block relocation vector, which is the conventional destination oriented disk block relocation vector annotated with data source information. Recall that the earlier described exemplary destination oriented disk block relocation vector includes disk block identifications (ID) 206, and corresponding disk block destinations 208 specifying for selected disk blocks where their contents are to be moved. For the exemplary disk block collection and the exemplary disk block relocations, disk blocks B1, B2, B4 and B5 are to be moved to disk blocks B2, B3, B5 and B6 respectively.

Initially, under the present invention, as in the prior art, relocation vector transformer 202 allocates available disk blocks as destination disk blocks for enumerated disk blocks in transformed relocation vector 204 with no specified destinations. Again, we will assume disk blocks B1 and B4 are assigned as destination disk blocks (as they will be free) for disk blocks B3 and B6. Unlike the prior art, vector transformer 202 then annotates each disk block entry with data source information. For example, since B2 is specified as the destination disk block of B1, so B2 is annotated accordingly identifying B1 as its data source. Similarly, B3 is specified as the destination disk block of B2, so B3 is annotated accordingly identifying B2 as its data source. The process continues, one disk block entry at a time, until all specified/assigned destination disk blocks have been annotated with their data sources.

Once the disk block relocation vector has been transformed, disk block relocation engine 200 initiates data move operations to accomplish the desired disk block relocation keying off the data source information. Relocation engine 200 first recognizes that the first three data moves form a cyclical chain of serial data moves. So, starting with the "tail" of the cyclical chain, the content of disk block B3 is moved to a staging disk block, e.g. disk block B7 (B3→B7). Next, the data source for the "emptied" disk block B3 is determined to be disk block B2, so the content of disk block B2 is moved to disk block B3 (B2→B3). Next, the data source for the "emptied" disk block B2 is determined to be disk block B1. Since the content of disk block B1 has not been disturbed, it is moved to disk block B2 (B1→B2). Then, the data source for the "emptied" disk block B1 is determined to be B3. However, B3 has been provided with new content and the "original" content is stored in staging disk block B7, so we move the "original"

content from the staging disk block B7 to B1 (B7→B1). At this time, the cyclical chain of serial data move has been completed, keying off the source data information.

Next, disk block relocation engine 200 searches through the disk block entries in transformed disk block relocation vector 202 to determine if there are any more chains of serial data moves to be performed. Once again, disk block relocation engine 200 recognizes that the next three moves form another cyclical chain of serial data moves. So, again starting at the "tail" of the cyclical chain, the content of disk block B6 is moved to staging disk block B7 (B6→B7). Next, the data source for the "emptied" disk block B6 is determined to be disk block B5. Since the content of disk block B5 has not been disturbed, it is moved to disk block B6 (B5→B6). Next, the data source for the "emptied" disk block B5 is determined to be disk block B4. Since the content of disk block B4 has not been disturbed, it is moved to disk block B5 (B4→B5). Then, the data source for the "emptied" disk block B4 is determined to be B6. However, B6 has been provided with new content and the "original" content of disk block B6 is stored in staging disk block B7, so we move the "original" content from the staging disk block B7 to B4 (B7→B4). At this time, all chains of serial data moves have completed, keying off the source information.

The results are summarized in FIG. 4B, showing that the desired exemplary disk block relocation is accomplished for the exemplary data collection with 8 move operations only under the present invention. In other words, the source oriented approach to disk block relocation provides about 30% improvement in performance over the prior art destination and swap oriented approach.

Figure 5:
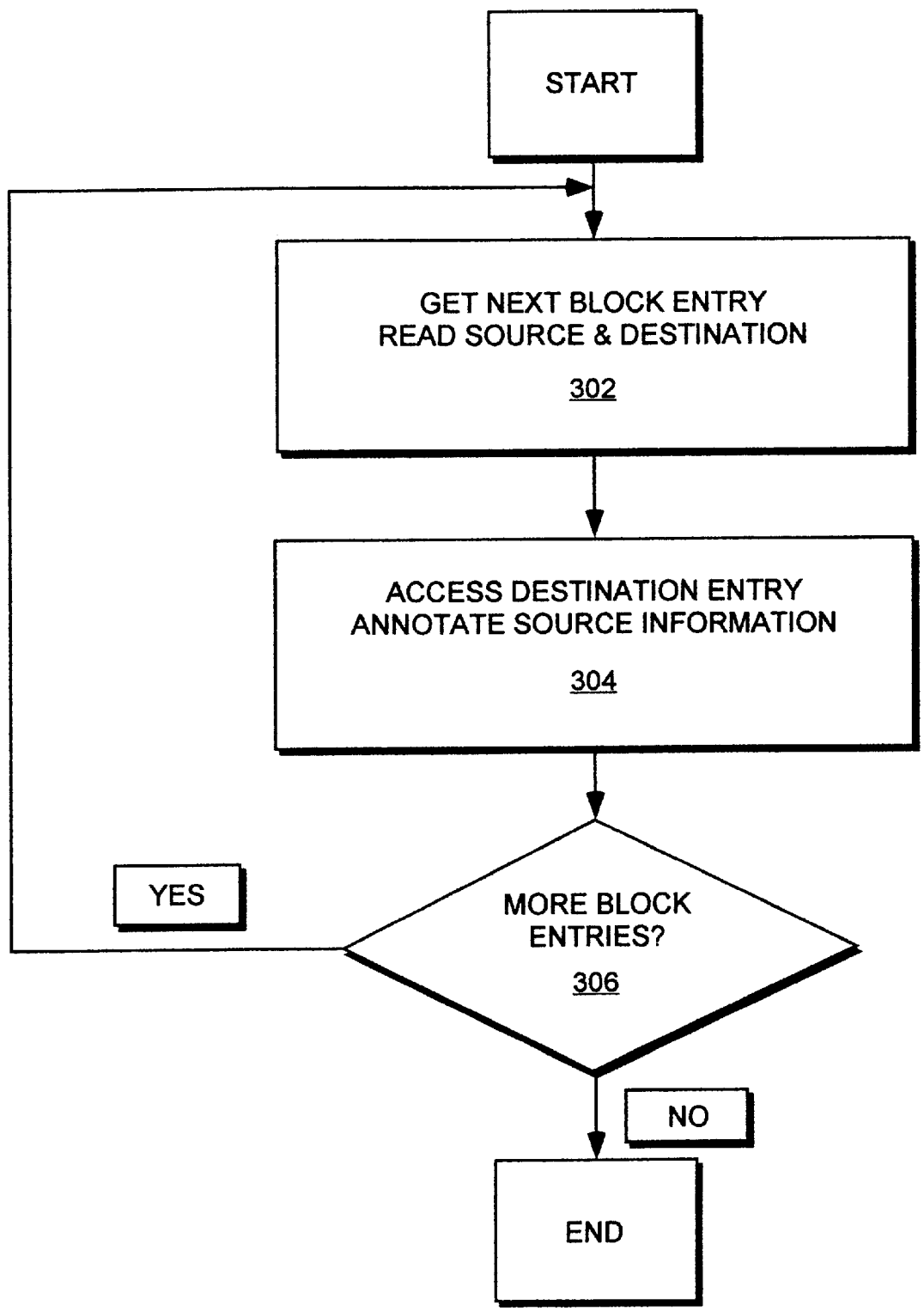
FIG. 5 illustrates one embodiment of the method steps of the present invention for annotating a disk block relocation vector with data source information.

FIG. 5 illustrates one embodiment of the method steps of the present invention for annotating a destination oriented disk block relocation vector with data source information. As shown, at step 302, a next disk block entry of the disk block relocation vector is read, and the specified/assigned destination is determined. Then, at step 304, the disk block entry corresponding to the determined destination is accessed, and annotated with the disk block ID of the destination specifying disk block entry as the disk block's data source. Steps 302 and 304 are repeated as long as there are disk block entries in the disk block relocation vector to be processed, step 306. The process terminates when all disk block entries in the disk block relocation vector have been processed.

Figure 6A:
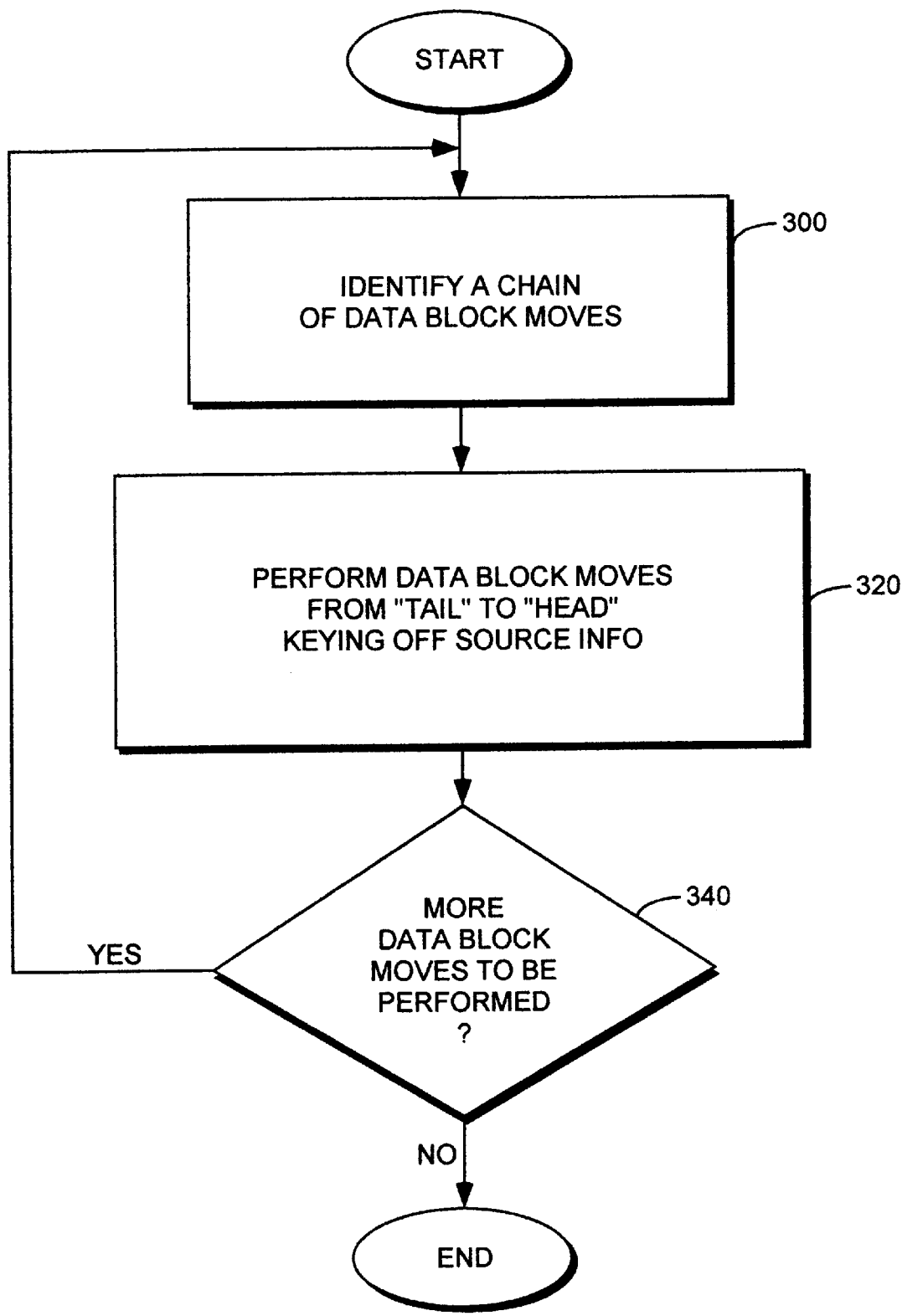
FIGS. 6A–6C illustrate one embodiment of the method steps of the present invention for moving data to accomplish a given set of desired disk block relocation.
Figure 6B:
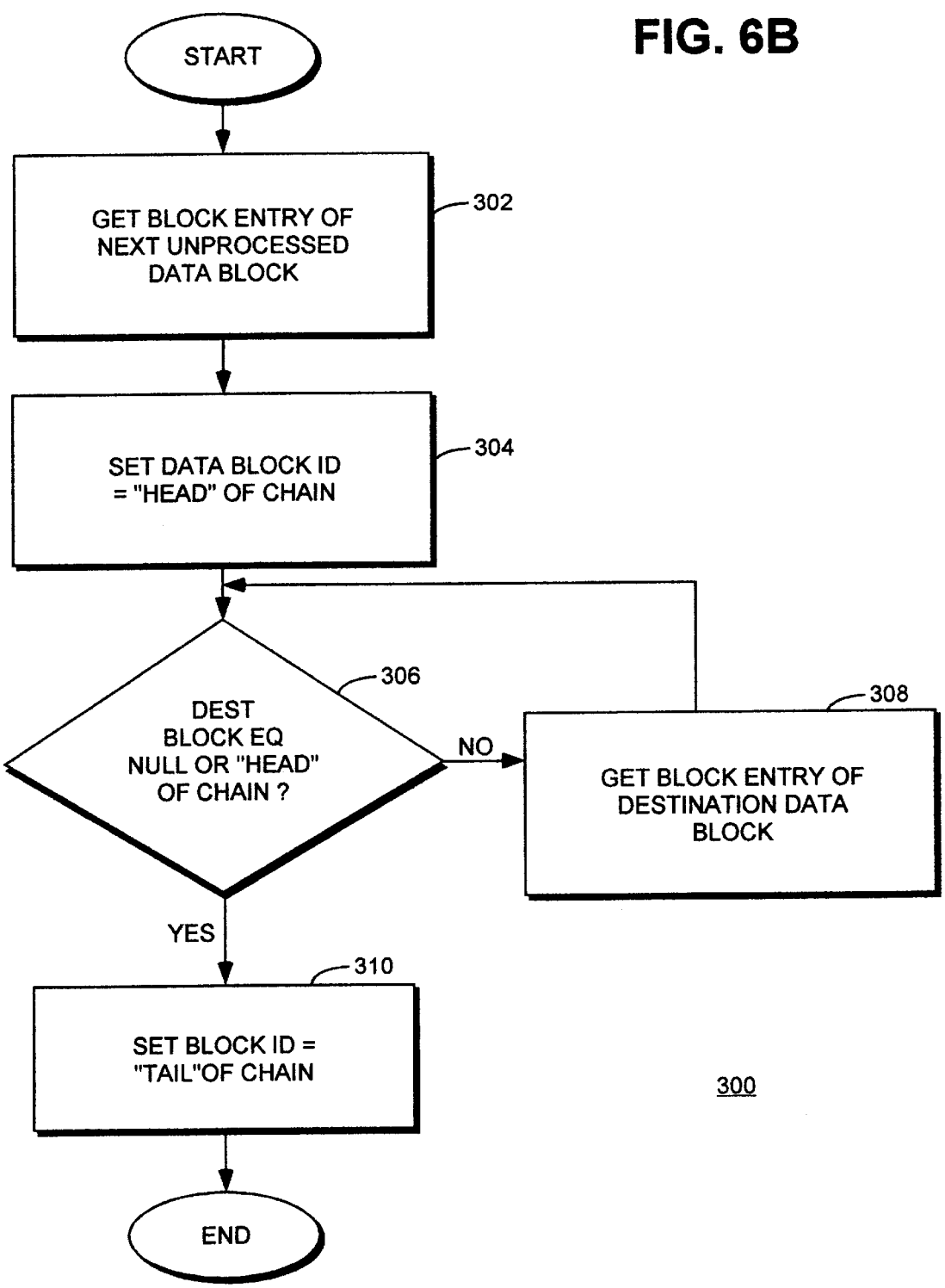
Figure 6C:
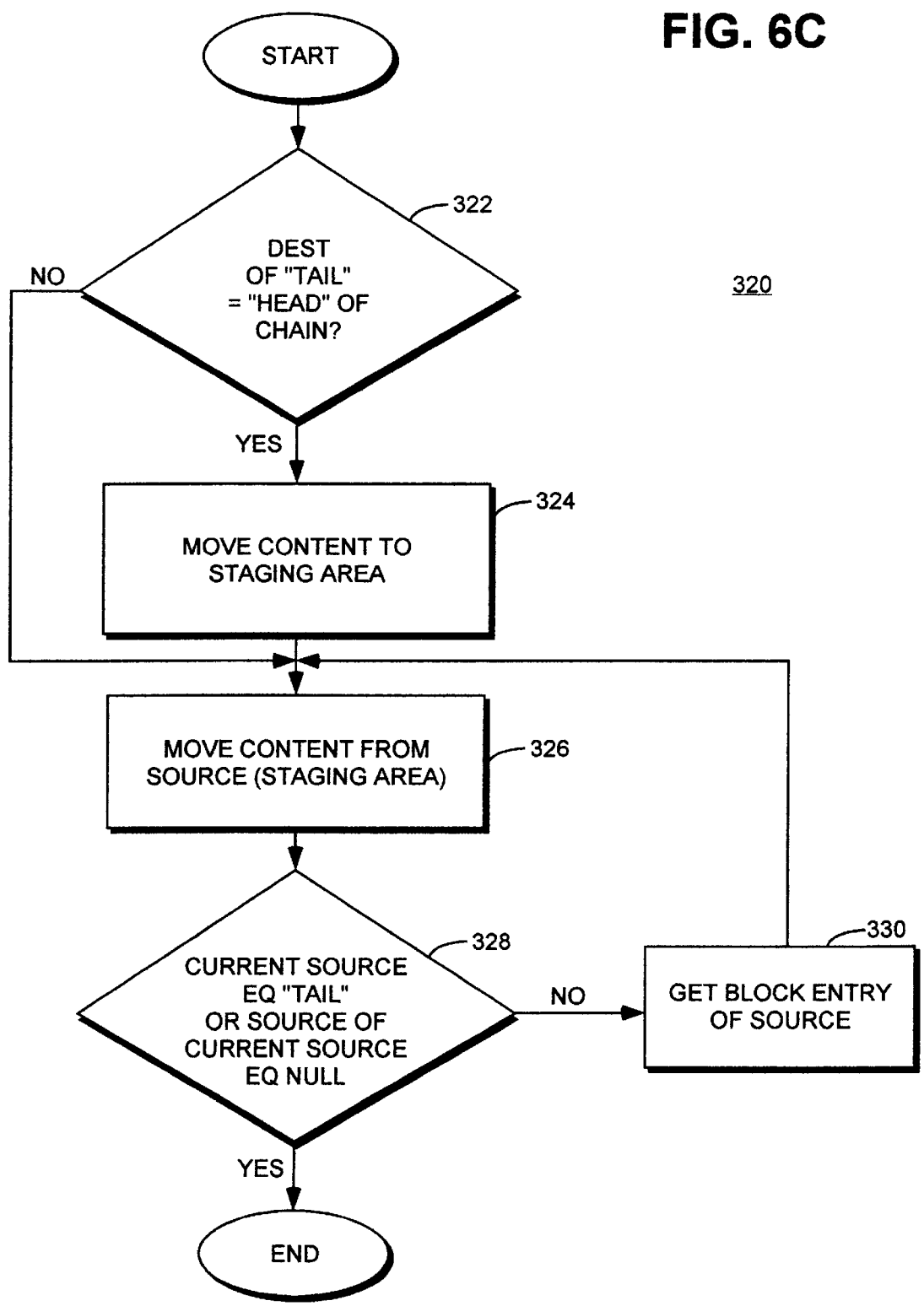

FIGS. 6A–6C illustrate one embodiment of the method steps of the present invention for performing data move operations to accomplish a desired set of disk block relocations. The overall process is illustrated in FIG. 6A. As shown, the data move process of the present invention starts at step 300, where relocation engine 200 examines transformed relocation vector 204 to identify a chain of serial data block moves. Under the present invention, a chain of serial data moves is a series of "serially related" data moves ending with either the last data block being moved to an "empty" data block or the last data block being moved to the first data block of the series. In other words, a chain of serial data moves is either an acyclical serial series (the first case) or a cyclical serial series (the latter case). The first data block of a serial series (either type) is also referred to as the "head" of the chain, and the last data block of a serial series (either type) is also referred to as the "tail" of the chain. [Both chains of serial data moves illustrated in FIG. 4A are of the cyclical type. An example of an acyclical serial chain is B8→B9→B10, where B10 is "empty" or contains no data.]

At step 320, upon identifying a chain of serial data block moves, relocation engine 200 performs the serial data block moves from the "tail" of the chain to the "head" of the chain, keying off the source information. [Those skilled in the art will appreciate that in the case of a cyclical chain, the "head" and "tail" designations are artificial. Any pair of "adjacent" members can be designated as the "head" and "tail" members of the chain.] Upon performing the serial data moves, at step 340, relocation engine 200 determines if there are more serial data moves to be performed. If so, relocation engine 200 returns to step 300 to identify the next chain of serial data moves, otherwise the process is terminated.

FIG. 6B illustrates one embodiment of the method steps for identifying a chain of serial data moves. As shown, the process starts at step 302, where relocation engine 200 retrieves the block entry of the next unprocessed data block. Relocation engine 200 "marks" the data block as the "head" of the chain, step 304. Relocation engine 200 then examines the destination data block of the retrieved block entry to determine if it is equal to either null or the "head" of the current chain, step 306. If the destination data block of the retrieved block entry is equal to neither, the end of the chain has not been found. Relocation engine 200 then retrieves the block entry of the destination data block, step 308, and returns to step 306. The process continues until eventually relocation engine 200 determines at step 306 that the destination block of the block entry current being examined is equal to either null or "head" of the chain. If the destination data block is equal to null, then a chain with the last data block moving into an "empty" data block has been found. On the other hand, if the destination data is equal to the "head" of the current chain, then a chain with the last data block moving into the first data block has been found. At such time, the sub-process of identifying a chain of serial data moves terminates.

FIG. 6C illustrates one embodiment of the method steps for performing a chain of serial data moves keying off the source information. As shown, the process starts at step 322, where relocation engine 200 determines if the destination data block of the "tail" of the chain is equal to the "head" of the chain. If the determination is affirmative, the content of the last data block is "saved", i.e. the content is moved to a staging area or an empty block. If the determination is negative or upon saving the content, content of the source data block is moved into the current data block, step 326. [Note that the source data block for the last data move of a cyclical chain of serial moves actually is located in a staging area.] Upon moving the content of the source data block, relocation engine 200 determines if either the current source is the "tail" of the chain, or the source of the current source is null. If neither is true, the chain of serial data moves has not been completed yet. Relocation engine 200 then retrieves block entry of the source data block, step 330, and returns to step 326. The process continues until eventually relocation engine 200 determines at step 328 that either the current source is the "tail" of the chain (cyclical) or the source of the current source is null (acyclical). At such time, the process of performing a chain of data moves terminates.

Figure 7A:
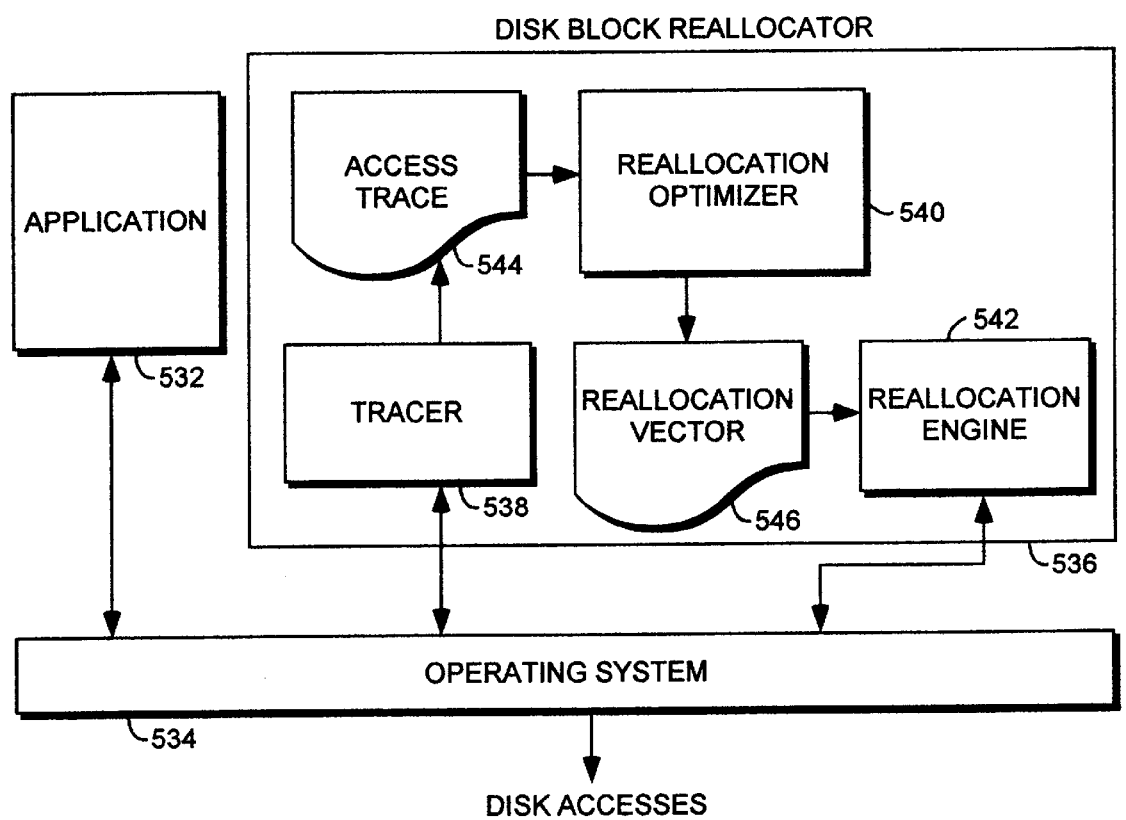
FIGS. 7A–7C illustrate three exemplary applications of the present invention.
Figure 7B:
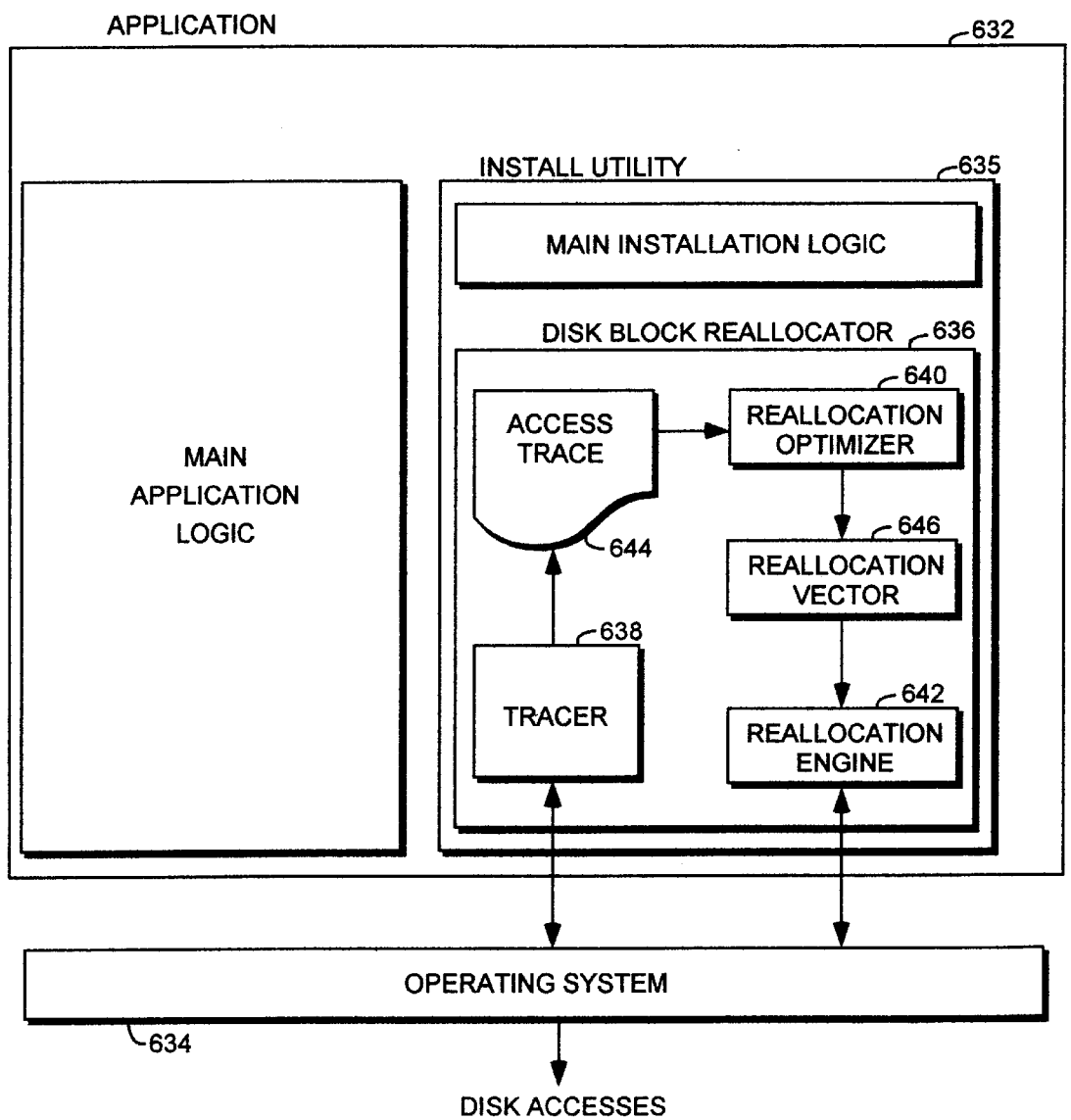
Figure 7C:
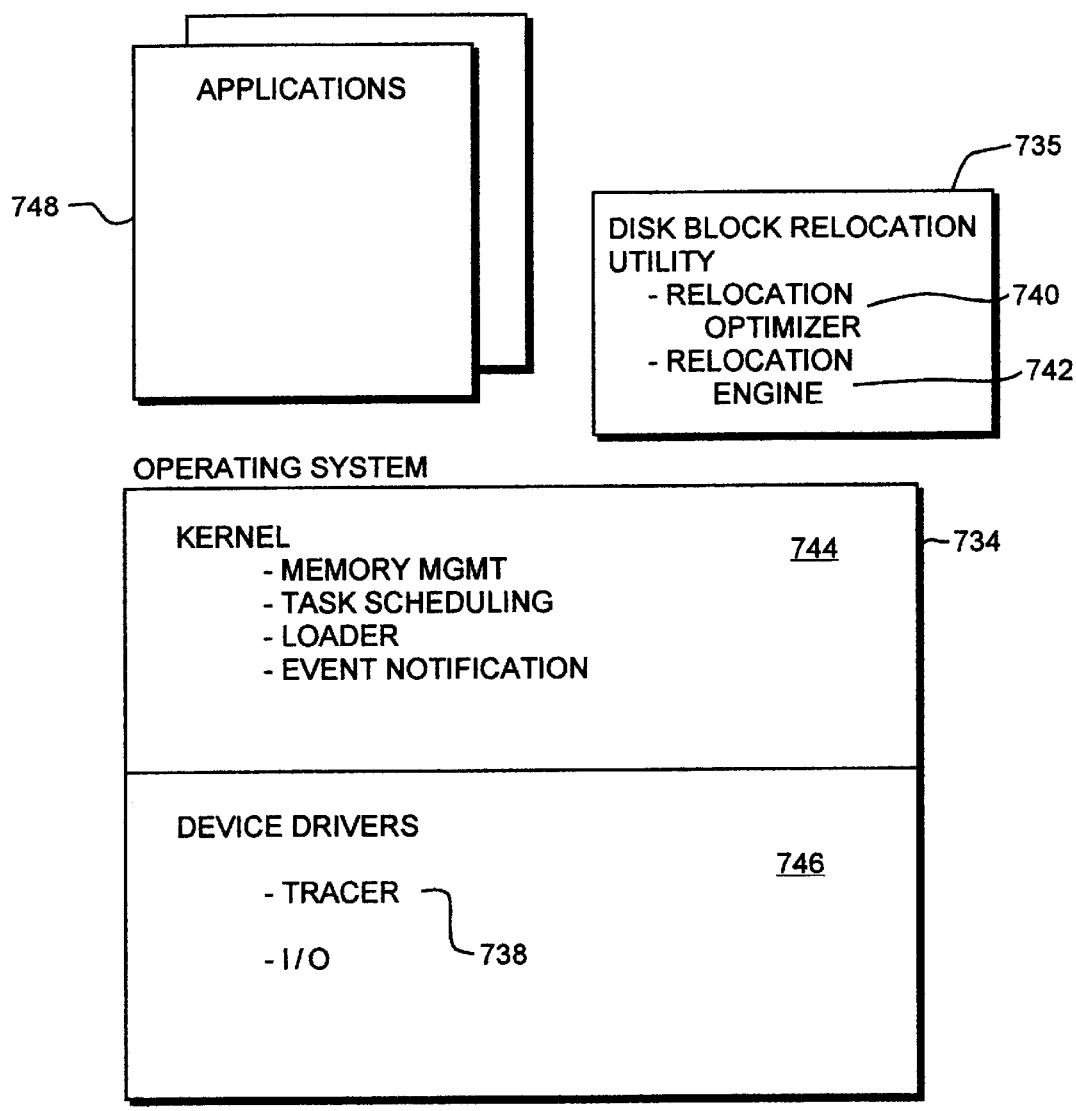

FIGS. 7A–7C illustrate three exemplary applications of the present invention. Relocation engine 542 of FIG. 7A is incorporated with the teachings of the present invention. Relocation engine 542 is included in a standalone disk block reallocator 536. In addition to relocation engine 542, disk block reallocator 536 includes tracer 538 and reallocation optimizer 540. Tracer 538 is used to generate access trace 544 comprising traces of a sequence of disk accesses of interest. Reallocation optimizer 540 is used to determine if an improved disk block allocation can be found, using access trace 544. If an improved disk block allocation can be found, reallocation optimizer 540 generates reallocation vector 546 specifying how certain disk blocks are to be reallocated, i.e. relocated. For the illustrated embodiment, reallocation vector 546 is generated in the conventional destination oriented manner. Relocation engine 542 effectuates the desired relocation in an improved manner, using the source oriented data move technique described earlier. For further description of tracer 538, access trace 544 and reallocation optimizer 540, see U.S. patent application, Ser. No. 08/708,983, which is hereby fully incorporated by reference.

Similarly, relocation engine 642 of FIG. 7B is incorporated with the teachings of the present invention. However, relocation engine 642 is included in disk block reallocator 636, which is included in application 632. More specifically, for the illustrated embodiment, disk block reallocator 636 is included in installation utility 635 of application 632. In addition to relocation engine 642, disk block reallocator 636 also includes tracer 638 and reallocation optimizer 640. Tracer 638 is used to generate access trace 644 comprising traces of a sequence of start-up disk accesses of application 632. Reallocation optimizer 640 is used to determine if an improved disk block allocation can be found, using access trace 644, to improve start-up time of the application. If an improved disk block allocation can be found, reallocation optimizer 640 generates reallocation vector 646 specifying how certain disk blocks are to be reallocated, i.e. relocated. For the illustrated embodiment, reallocation vector 646 is generated in the conventional destination oriented manner. Relocation engine 642 effectuates the desired relocation in an improved manner, using the source oriented data move technique described earlier, to improve the start-up time of application 632. For further description of tracer 638, access trace 644 and reallocation optimizer 640, see U.S. patent application, Ser. No. 08/721,826, which is hereby fully incorporated by reference.

Likewise, relocation engine 742 of FIG. 7C is incorporated with the teachings of the present invention. Relocation engine 742 is included in a complementary disk block relocation utility 735. In addition to relocation engine 742, disk block relocation utility 735 includes relocation optimizer 740. Additionally, operating system 734 is provided with tracer 738. Tracer 738 is used to generate access traces (not shown) comprising traces of a sequence of disk accesses by operating system 734 during system start-up/boot time. Reallocation optimizer 740 is used to determine if an improved disk block allocation can be found, using the generated access traces, to improve the start-up/boot time of the operating system. If an improved disk block allocation can be found, relocation optimizer 740 generates a relocation vector (not shown) specifying how certain disk blocks are to be relocated. For the illustrated embodiment, the relocation vector is generated in the conventional destination oriented manner. Relocation engine 742 effectuates the desired relocation in an improved manner, using the source oriented data move technique described earlier, to improve the start-up/boot time of the operating system. For further description of tracer 738 and relocation optimizer 740, see U.S. patent application, Ser. No. 08/822,640, which is hereby fully incorporated by reference.

Additionally, for each of the applications illustrated in FIGS. 7A through 7C, tracer 538, 638 or 738 may trace logical file accesses, and then map the logical file accesses to physical disk block accesses, as opposed to tracing the physical disk block accesses directly, as disclosed in U.S. patent application Ser. No. 08/885,325 (attorney docket ref. 42390.P4586, filed contemporaneously), which is also hereby fully incorporated by reference. Furthermore, for each of the three applications, a de-optimization detection function as disclosed in U.S. patent application Ser. No. 08/885,326 (attorney docket ref. 42390.P4585, filed contemporaneously) may also be incorporated. Application Ser. No. 08/885,326 is also hereby fully incorporated by reference.

FIG. 8 illustrates one embodiment of a computer system suitable for equipping with the operating system of the present invention described above. As shown, for the illustrated embodiment, computer system 800 includes processor 802, processor bus 806, high performance I/O bus 810 and standard I/O bus 820. Processor bus 806 and high performance I/O bus 810 are bridged by host bridge 808, whereas I/O buses 810 and 812 are bridged by I/O bus bridge 812. Coupled to processor bus 806 is cache 804. Coupled to high performance I/O bus 810 are system memory 814 and video memory 816, against which video display 818 is coupled. Coupled to standard I/O bus 820 are disk drive 822, keyboard and pointing device 824 and communication interface 826.

These elements perform their conventional functions known in the art. In particular, disk drive 822 and system memory 814 are used to store a permanent and a working copy of the programming instructions of disk block relocation engine 200 of the present invention, effectuating the teachings of the present invention, when executed by processor 802. The permanent copy may be pre-loaded into disk drive 822 in factory, loaded from a distribution medium (not shown), or down loaded from on-line/networked distribution source (not shown). The constitutions of these elements are known. Any one of a number of implementations of these elements known in the art may be used to form computer system 800.

While the method and apparatus of the present invention have been described in terms of the illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

Thus, an improved data block relocation methodology and various applications of the methodology have been described.

What is claimed is:

1. An apparatus comprising:
   (a) an execution unit for executing programming instructions; and
   (b) a storage medium coupled to the execution unit and having stored therein a first plurality of programming instructions to be executed by the execution unit for implementing a data block relocation function that successively relocates data blocks by successively examining data block destinations and keying off the data block destinations' data sources, a second plurality of programming instructions that annotates data block destinations of a destination oriented data block relocation vector with the data block destinations' data sources.

2. The apparatus as set forth in claim 1, wherein the first plurality of programming instructions include programming instructions for examining a vector of specified data moves, and identifying chains of serial data moves specified therein.

3. The apparatus as set forth in claim 2, wherein the chains of serial data moves include chains of an acyclical type and chains of a cyclical type.

4. The apparatus as set forth in claim 1, wherein the data block relocation function is an integral part of a disk block relocation engine.

5. The apparatus as set forth in claim 4, wherein the disk block relocation engine is an integral part of a standalone disk block reallocator.

6. The apparatus as set forth in claim 4, wherein the disk block relocation engine is an integral part of an application.

7. The apparatus as set forth in claim 4, wherein the disk block relocation engine is an integral part of a complementary function to an operating system equipped to trace its own disk accesses during start-up/boot time.

8. The apparatus as set forth in claim 1, wherein the apparatus is a computer system.

9. An apparatus comprising:
   an execution unit for executing programming instructions; and
   a storage medium coupled to the execution unit and having stored therein a plurality of programming instructions to be executed by the execution unit for implementing a data block relocation function that successively relocates data blocks by successively examining data block destinations and keying off the data block destinations' data sources, for examining a vector of specified data moves and identifying chains of serial data moves specified therein, and for performing the data moves from a first end of a chain of data moves to a second end of the chain of data moves, successively examining data block destinations and keying off the data block destinations' data sources.

10. A machine implemented method comprising the steps of:
   a) identifying a chain of serial data moves among a plurality of specified data moves;
   b) performing the chain of serial data moves from a first end of the chain to a second end of the chain, successively examining data block destinations and keying off the data block destinations' data sources, and annotating the data block destinations of a destination oriented data block relocation vector with the data block destinations' data sources.

11. The method as set forth in claim 10, wherein the method further includes step (c) repeating steps (a) and (b) until all specified data moves have been performed.

12. The method as set forth in claim 10, wherein the chain of serial data moves include chains of an acyclical type, and chains of a cyclical type.

13. A machine readable storage medium having stored therein a plurality of programming instructions that implements the method steps of:
   a) identifying a chain of serial data moves among a plurality of specified data moves;
   b) performing the chain of data moves from a first end of the chain to a second end of the chain, by successively examining data block destinations and keying off the data block destinations' data sources, and annotating the data block destinations of a destination oriented data block relocation vector with the data block destinations' data sources.

14. The storage medium of claim 13, wherein the method further comprises step (c) repeating steps (a) and (b) until all specified data moves have been performed.

15. The storage medium of claim 13, wherein the chains of serial data moves include chains of an acyclical type, and chains of a cyclical type.

16. The storage medium of claim 13, wherein the programming instructions are integral parts of a disk block relocation engine.

17. The storage medium of claim 16, wherein the disk block relocation engine is an integral part of a standalone disk block reallocator.

18. The storage medium of claim 16, wherein the disk block relocation engine is an integral part of an application.

19. The storage medium of claim 16, wherein the disk block relocation engine is an integral part of a complementary function to an operating system equipped to trace its own disk accesses during start-up/boot time.

* * * * *